United States Patent [19]

Brooks et al.

[11] Patent Number: 4,913,976
[45] Date of Patent: Apr. 3, 1990

[54] COHESIVE BONDING PROCESS FOR FORMING A LAMINATE OF A WEAR RESISTANT THERMOPLASTIC AND A WEATHER RESISTANT RUBBER

[75] Inventors: Mark L. Brooks; Keith E. Wilson, both of Wabash, Ind.

[73] Assignee: GenCorp Inc., Fairlawn, Ohio

[21] Appl. No.: 148,247

[22] Filed: Jan. 25, 1988

[51] Int. Cl.$^4$ .............................. B32B 25/08
[52] U.S. Cl. ........................ 428/494; 428/517; 428/908.8
[58] Field of Search ............ 428/908.8, 517, 494

[56] References Cited

U.S. PATENT DOCUMENTS 4,596,734 6/1986 Kramer ........................ 428/462

FOREIGN PATENT DOCUMENTS 300341 of 1971 U.S.S.R. ................. 428/494

*Primary Examiner*—Edith Buffalow

[57] ABSTRACT

A polymer laminate produced by crosshead extrusion suitable for wear resistant applications such as a vehicle glass run channel comprises a layer of a weather resistant rubber such as an ethylene-propylenediene (EPDM) rubber and a layer of a wear resistant thermoplastic such as polypropylene. The laminate is passed through an oven at an elevated temperature sufficient to cure the EPDM rubber, for example, at about 375° F., with ambient temperature cooling fluid being blown over the exposed surface of the polypropylene thermoplastic. The interior polypropylene surface or interface is heated by the EPDM rubber which is at a high temperature as a result of the heat of extrusion and heat generated by cure thereof. As a result, the polypropylene interior surface or interface melts and causes it to flow and form a mechanical bond with the EPDM rubber while the exposed surface as well as a substantial portion of the polypropylene is kept from melting by the cooling fluid. The EPDM rubber can be extruded in the form of a channel having a longitudinal web which supports and is bonded to the laminated polypropylene wear strip to form a glass run channel.

11 Claims, 1 Drawing Sheet

COHESIVE BONDING PROCESS FOR FORMING A LAMINATE OF A WEAR RESISTANT THERMOPLASTIC AND A WEATHER RESISTANT RUBBER

FIELD OF THE INVENTION

The present invention relates to a process for bonding a wear resistant thermoplastic to a weather resistant rubber to form a laminate which finds a particular use in the manufacture of glass run channels.

BACKGROUND ART

Heretofore, no process has been known to bond a layer of polypropylene to a layer of ethylene-propylenediene (EPDM) rubber to form a laminate without the use of adhesives, etc. Accordingly, it has not been known to produce a glass run strip having a channel shaped gasket of EPDM rubber with a polypropylene wear strip laminated to the base of the channel.

U.S. Pat. No. 4,538,380 to Colliander relates to a low friction weather seal having a semirigid base member of polypropylene, a tubular sealing member of a thermoplastic elastomer and a thin film of polypropylene or a polypropylene blend which caps all or part of the sealing member.

U.S. Pat. No. 3,918,206 to Dochnahl relates to a window guide having a resilient gasket forming a U-shaped channel wherein the glass-engaging portions of the gasket have an anti-friction coating of polytetrafluoroethylene.

U.S. Pat. No. 3,624,964 to Bordner et al relates to a channel-shaped weatherstrip having a sandwich construction composed of a relatively thin outer layer of a relatively hard wear-resistant plastic which is heat-bonded to an inner core of a relatively soft, foamed or expanded plastic.

U.S. Pat. No. 3,659,983 to McLain et al relates to a spinnerette having a unique molten polymer passageway and gas passageway to supply an inert gas to the center of a hollow fiber as it is extruded.

U.S. Pat. No. 4,104,098 to Hush et al relates to a method and apparatus for curing and reinforcing hose wherein a portion of the hose is cooled so that it is not cured as are the remaining heated portions.

U.S. Pat. No. 4,296,062 to Gauchel et al relates to the coextrusion of elongated profile members made of thermoplastic synthetic resins.

SUMMARY OF THE INVENTION

It is therefore an aspect of the present invention to provide a process to adhere or bond a layer of a wear resistant thermoplastic to a layer of a weather resistant rubber. An adhesive free bond is achieved by crosshead extrusion of the two layers and subsequently curing the rubber at a cure temperature typically above the melting temperature of the thermoplastic. During cure, a fluid such as air is blown over the exposed surface of the thermoplastic layer so that only a portion of the same which is in contact with the rubber layer will melt. The process results in an effective mechanical fusion of the thermoplastic and the rubber layers. A glass run strip can be produced by this process. The glass run strip includes a rubber housing having an enclosed internal channel and typically a crosshead extruded low friction thermoplastic wear strip bonded to the base of the channel. The combination of the crosshead extruding and the curing processes results in an efficient and effective method of manufacturing an improved glass run strip.

DETAILED DESCRIPTION OF THE INVENTION

Figure 1:
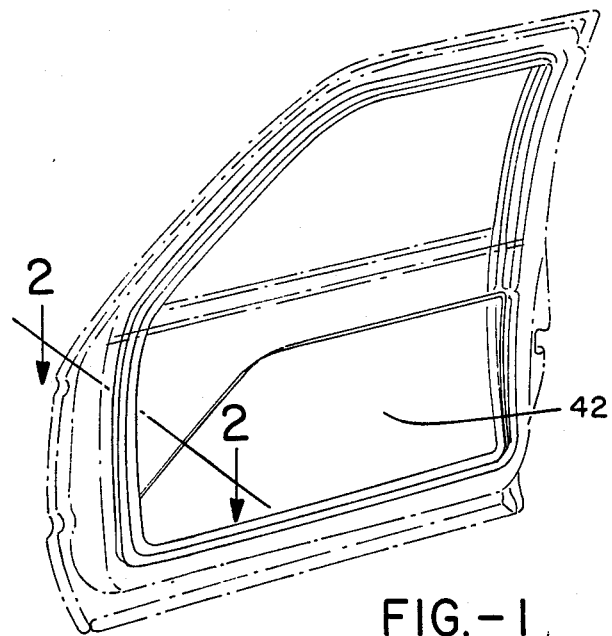
FIG. 1 is a perspective view of a vehicle door containing the glass run strip of the present invention therein.

The present invention relates to a polymer laminate and to a process for forming the same comprising a layer of a wear resistant thermoplastic such as polypropylene adhered to a layer of a weather resistant rubber, e.g., ethylene-propylene-diene (EPDM) rubber. The layers are extruded through a crosshead die and the extrudate is passed through an oven at a temperature which is sufficient to cure the rubber layer. Such cure temperature is typically above the melting point of the thermoplastic. A cooling fluid such as an air stream at ambient or low temperature is passed over the exposed surface of the thermoplastic layer so that only a portion thereof is sufficiently heated so that it is melted. The melted thermoplastic is thus fused to the rubber and forms a mechanical bond. Once the rubber has been cured, the laminate is rapidly cooled by blowing an ambient or low temperature water jet or air mist over the exterior base portion of the rubber.

It is preferable to utilize a wear resistant rubber which cures rapidly and which has good adhesion to the thermoplastic layer. Such weather resistant rubbers are known to the art and to the literature. Examples of such rubbers include EPDM rubber, styrene-butadiene rubber, polychloroprene rubber, nitrile-polyvinyl chloride rubber blends, and the like. Such weather resistant rubbers are utilized inasmuch as they have good oxidation resistance, good ozone resistance, and generally do not degrade or deteriorate when exposed to the earth's atmosphere. EPDM rubber is preferred. It is to be understood that the various silicone rubbers are not within the scope of the present invention. Considering the preferred EPDM rubber, better adhesion results when the amount of ethylene units therein is from about 45 percent by weight to about 75 percent by weight and desirably from about 50 to about 60 percent by weight based upon the total weight of the ethylene units and the propylene units. The diene is a non-conjugated monomer having from about 5 to about 10 carbon atoms with from 6 to 9 carbon atoms being preferred. Monomers which yield a fast cure are desired. Specific non-conjugated dienes include pentadiene, hexadiene, norbornene, methyl norbornene, ethylidene norbornene, heptadiene, and the like. An example of a particularly well-suited diene is ethylidene norbornene. Inasmuch as it is desirable that the EPDM rubbers have high amounts of unsaturation therein, the amount of the diene monomer repeating unit is generally from about 4 to about 15 percent by weight of the terpolymer system with from about 6 to about 12 percent being desired and from about 8 to about 11 percent being preferred.

The thermoplastic compound is generally a polymer which has good wear resistance, a low coefficient of friction, and typically melts at a temperature of 350° F. or less. Examples of such thermoplastic compounds include polyethylene, polypropylene, and the like with polypropylene being preferred. The thermoplastic generally has a high density, that is, from about 0.9 to about 1.2 grams/cc, with from about 0.9 to about 1.1 grams/cc being preferred and about 0.95 grams/cc being optimum. The polypropylene utilized in the present invention has a melting point from about 275° to about 350° F., with from about 300° F. to about 330° F. being preferred.

Mechanical bonding or fusion of the thermoplastic to the rubber is achieved by melting the thermoplastic interface, for example polypropylene, in contact with the rubber. Generally less than 10 percent of the total amount of the thermoplastic melts. Of course, a larger or smaller amount of the thermoplastic can be melted. The amount of the perimeter of the thermoplastic layer will also vary depending upon the amount thereof in contact with the rubber. In the preferred embodiments set forth hereinbelow, approximately 60 percent of the thermoplastic perimeter melts.

Figure 2:
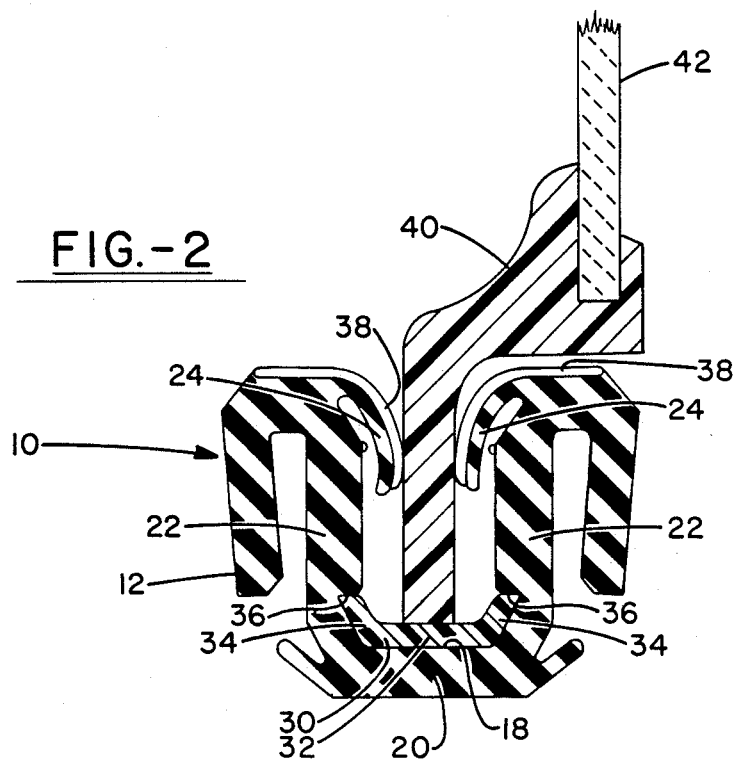
FIG. 2 is a cross-sectional view taken on line 2—2 of FIG. 1 showing a vehicle window engaging the glass run strip of the present invention.

The glass run strip of the invention is generally indicated by the numeral 10 in FIG. 2 and includes a resilient gasket 12 and a wear strip 30. The gasket 12 is formed having an interior channel 18 having a bottom web 20 joined on either longitudinal side to a transverse side wall 22. Each side wall 22 has a lip 24 which extends in and down toward the center of the channel 18. The lips 24 form a closure for the channel 18.

A thermoplastic wear strip 30 such as polypropylene having a suitable depth or thickness as about 0.075 inches has a central portion 32 bounded on each longitudinal side by a shoulder 34. The shoulders 34 abut with recesses 36 formed between the web 20 and the side walls 22 to help hold the wear strip 30 in position within the channel 18.

The upper surface of lips 24 can contain flock 38 thereon to provide a seal for the window foot 40. The foot 40 is generally a urethane material. One edge rides in the channel along the wear strip while the other end of the foot 40 provides a seat for the window pane 42. Thus, window foot 40 pries lips 24 apart and resiliently engages the same through flock layer 38. The base of foot 40 contacts the longitudinal polypropylene wear strip 30. Accordingly, as window 42 of a vehicle is rolled up and down, the base portion of window foot 40 engages the thermoplastic wear strip and not the low wear resistant EPDM rubber.

According to the concepts of the present invention, the thermoplastic layer such as polypropylene and the rubber gasket such as EPDM are extruded in a crosshead die. Any conventional type of extruder known to the art as well as to the literature can generally be utilized. Inasmuch as a thermoplastic material or wear strip is not melted but processed at ambient or a warm temperature, a crosshead die is utilized. That is, the wear strip 30 is extruded through a crosshead die which places it into contact with the heated gasket 12 under a sufficient uniform pressure such that the gasket and wear strip are pushed or forced together. Due to the high temperature of the extruded rubber, as well as the exotherm created by the curing reaction, a narrow strip or interior layer along the bottom of the thermoplastic wear strip which engages or forms interface with the rubber is melted. The extrusion temperature of the rubber is suitably high such that it can be easily worked and extruded. Temperatures of from about 190° to about 220° F. are often suitable, especially with EPDM rubber.

Immediately upon the crosshead extrusion, the glass run strip is fed to an oven at a temperature usually above the melting point of the thermoplastic such that a suitable cure rate of the rubber is obtained. In order to prevent the entire wear strip from melting, a cooling fluid is blown through the channel formed by bottom web 20, side walls 22, and lips 24 which serve to form a complete enclosure. A suitable cooling fluid is ambient temperature air, although other compounds can be utilized. Naturally, the cooling fluid is applied at a rate sufficient to prevent the exposed surface, that is the non-rubber contacting surface of the thermoplastic wear strip from melting. The cooling fluid is supplied to the interior of the channel until the glass run strip is removed from the oven at which time cool or ambient temperature moist air is added to quickly cool the bottom exterior surface, that is the channel portion of the glass run strip.

The glass run strips produced in accordance with the present invention can be utilized wherever a rubber type gasket material having good wear resistance is desired. As set forth in FIG. 1, one such use is as a wear channel for a vehicle window.

While in accordance with the Patent Statutes, the best mode and preferred embodiment have been set forth, the scope of the invention is not limited thereto, but rather by the scope of the attached claims.

What is claimed is:

1. A wear resistant polymer laminate, comprising: a thermoplastic wear resistant layer having a melting point of less than 350° F. mechanically melt bonded to a cured weather resistant rubber layer along a mutual interior interface, each of said layers being free of adhesive on the surfaces bonded.

2. A wear resistant polymer laminate according to claim 1, wherein said cured weather resistant rubber is a styrene-butadiene rubber, a polychloroprene rubber, a nitrile-polyvinyl chloride rubber blend, an EPDM rubber, or combinations thereof, wherein less than 10 percent of the total amount of said thermoplastic layer is melt bonded.

3. A wear resistant polymer laminate according to claim 1, wherein said thermoplastic layer has a perimeter with an interior surface and an exposed surface, wherein said thermoplastic layer is bonded to said weather resistant rubber layer by applying heat from said weather resistant rubber layer to said thermoplastic interior surface wherein approximately 60 percent of said thermoplastic perimeter is melt bonded while subjecting said thermoplastic exposed surface to a cooling fluid.

4. A wear resistant polymer laminate according to claim 1, wherein said cured weather resistant rubber is a styrene-butadiene rubber, a polychloroprene rubber, a nitrile-polyvinyl chloride rubber blend, and EPDM rubber, or combinations thereof, and wherein said thermoplastic layer is polypropylene having a density of from about 0.9 to about 1.2 grams per cc.

5. A polymer laminate, comprising a cured EPDM layer and a polypropylene layer, wherein said cured EPDM rubber layer contains from about 45 percent to about 75 percent by weight of ethylene units therein based upon the total weight of said ethylene and propylene units, wherein said cured EPDM rubber layer contains from about 4 percent to about 15 percent by weight of non-conjugated diene units based upon the total weight of said cured EPDM rubber, said diene unit having from about 5 to about 10 carbon atoms, wherein said polypropylene layer has a melting point of from about 275° F. to about 350° F., and wherein said polypropylene layer along a mutual interior interface is laminated to said EPDM layer by means of transferring heat from said EPDM layer to said polypropylene layer such that said thermoplastic layer is mechanically melt bonded along said mutual interior interface while the exterior portion of said thermoplastic layer is not melted during melt bonding.

6. A wear resistant polymer laminate according to claim 4, wherein said cured weather resistant rubber to said EPDM rubber, wherein said cured EPDM rubber layer contains from about 50 percent to about 60 percent by weight of ethylene units therein based upon a total weight of said ethylene and propylene units, wherein said non-conjugated diene of said cured EPDM rubber has from 6 to 9 carbon atoms, and wherein the amount of said non-conjugated diene unit is from about 6 to about 12 percent by weight based upon the total weight of said cured EPDM rubber.

7. A wear resistant polymer laminate according to claim 6, wherein the amount of said non-conjugated diene is from about 8 percent to about 11 percent by weight based upon the total weight of said cured EPDM rubber, wherein said polypropylene density is from about 0.9 to about 1.1 grams per cc, and wherein the melting point of said polypropylene is from about 300° F. to about 330° F.

8. A wear resistant two-component laminate system, comprising;
   mechanically bonded first and second layers, said first layer being a thermoplastic wear resistant material having a melting point of less than 350° F., said second layer being a cured weather resistant rubber material, each of said layers being free of adhesive on the bonded surfaces.

9. A wear resistant polymer two-component laminate system according to claim 8, wherein said cured weather resistant rubber is a styrene-butadiene rubber, a polychloroprene rubber, a nitrile-polyvinyl chloride rubber blend, an EPDM rubber, or combinations thereof.

10. A wear resistant polymer laminate according to claim 9, wherein said thermoplastic layer has an interior surface and an exposed surface, wherein said thermoplastic layer is bonded to said weather resistant rubber layer by applying heat from said weather resistant rubber layer to said thermoplastic interior surface while subjecting said thermoplastic exposed surface to a cooling fluid.

11. A wear resistant polymer according to claim 10, wherein said thermoplastic layer is polypropylene having a density of from about 0.9 to about 1.2 grams per cc, and wherein said cured weather resistant rubber layer is said EPDM rubber.

* * * * *

UNITED STATES PATENT AND TRADEMARK OFFICE
CERTIFICATE OF CORRECTION

PATENT NO. : 4,913,976
DATED : April 3, 1990
INVENTOR(S) : Mark L. Brooks and Keith E. Wilson It is certified that error appears in the above-identified patent and that said Letters Patent is hereby corrected as shown below:

ABSTRACT, line 4, which reads "ethylene-propylenediene" should read --ethylene-propylene-diene--.

Column 4, lines 59 and 60, which reads "EPDM layer" should read --EPDM rubber layer--.

Column 5, line 11, which reads "to" should read --is--.

Signed and Sealed this

Second Day of April, 1991

Attest:

HARRY F. MANBECK, JR.

Attesting Officer

Commissioner of Patents and Trademarks

Disclaimer 4,913,976—*Mark L. Brooks; Keith E. Wilson*, both of Wabash, Ind. COHESIVE BONDING PROCESS FOR FORMING A LAMINATE OF A WEAR RESISTANT THERMOPLASTIC AND A WEATHER RESISTANT RUBBER. Patent dated Apr. 3, 1990. Disclaimer filed Feb. 25, 1991, by the assignee, GenCorp Inc.

Hereby enters this disclaimer to claim 8 of said patent.
[ *Official Gazette June 11, 1991* ]